Sept. 11, 1945. R. J. PIPER 2,384,557
POSTHOLE DIGGER ATTACHMENT FOR TRACTORS
Filed June 26, 1944 2 Sheets-Sheet 2
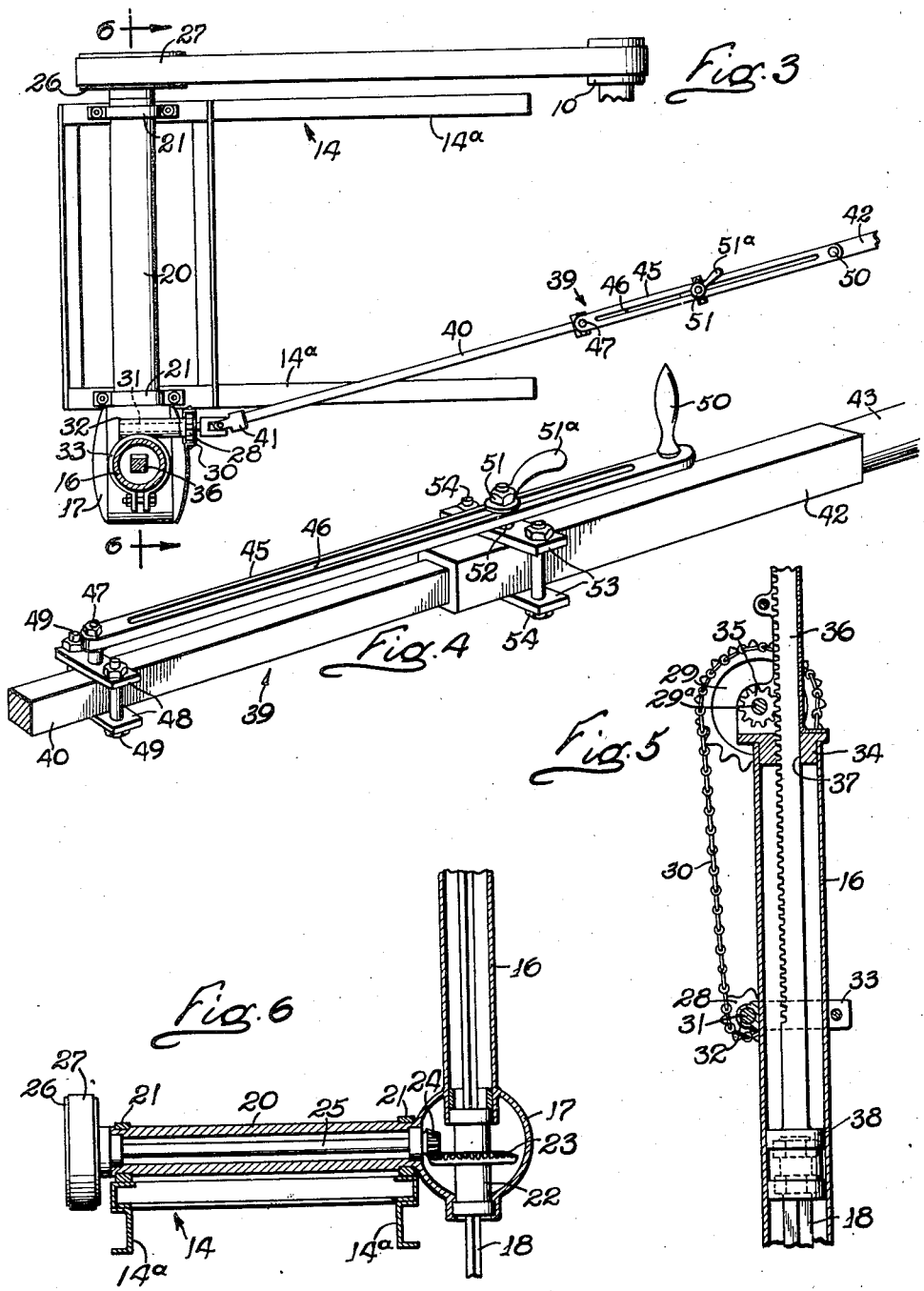

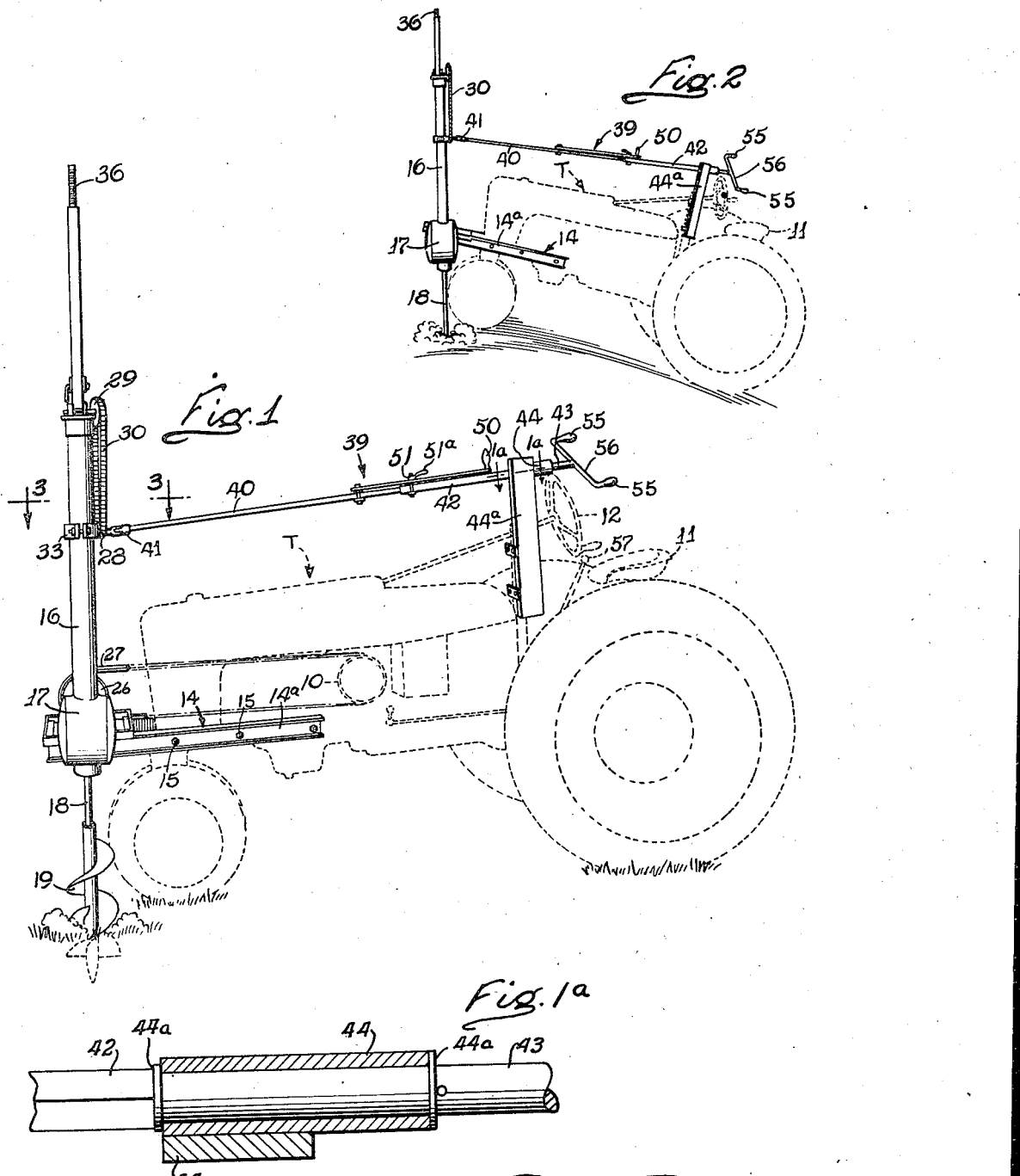

Patented Sept. 11, 1945

2,384,557

UNITED STATES PATENT OFFICE 2,384,557

POSTHOLE DIGGER ATTACHMENT FOR TRACTORS

Roger June Piper, Princeton, Ill.

Application June 26, 1944, Serial No. 542,097

3 Claims. (Cl. 255—19)

The present invention pertains to a novel posthole digger attachment for tractors and constitutes in many respects an improvement upon that shown in my prior Patent No. 2,250,081, issued July 22, 1941.

One object of the present invention is to provide such an attachment embodying a novel arrangement for manually applying torsion either to speed up or retard the feed of the auger to accommodate particular ground conditions which may be encountered.

More specifically, it is an object of the invention to provide an attachment of the character indicated embodying a novel arrangement utilizing a single operating shaft for not only applying force either to speed up or retard the feed of the auger bit, but also to adjust the angle of tilt of the auger with reference to the tractor, such shaft being conveniently manipulable from the driver's station that may be somewhat remote from the auger (for example, the driver's station may be at the rear of the tractor and the auger itself mounted on the opposite or front end), thus making possible one man operation of the whole outfit.

Further objects and advantages of the invention will become apparent as the following description proceeds, taken in connection with the accompanying drawings, in which Figure 1 is a perspective view of a posthole digging attachment embodying the present invention and shown as applied to a tractor, the latter being indicated in dotted outline.

Fig. 1ª is an enlarged detailed sectional view taken substantially along the line 1ª—1ª in Fig. 1.

Fig. 2 is a view similar to Fig. 1, on a somewhat smaller scale, and showing the attachment adjusted for boring with the tractor stationed on a hillside.

Fig. 3 is a plan view of the attachment, partially in section along the line 3—3 in Fig. 1.

Fig. 4 is an enlarged fragmentary detailed view of a portion of the operating shaft of the attachment.

Fig. 5 is a fragmentary vertical sectional view through the upper portion of the supporting housing of the attachment.

Fig. 6 is a vertical sectional view taken substantially along the line 6—6 in Fig. 3.

While the invention is susceptible of various modifications and alternative constructions I have shown in the drawings and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

Referring more particularly to the drawings, the invention has been exemplified therein as embodied in a posthole digging attachment applied to a tractor T and from which it is powered. The tractor itself may, of course, be of conventional form and it is, in fact, one of the virtues of the present attachment that it is applicable to a wide variety of tractors. The tractor T here shown has, as is common, a power take-off pulley 10 on one side and a driver's station at the rear end where the seat 11 and steering wheel 12 are located.

In the present instance, the attachment is shown as secured to the end of the tractor opposite the driver's seat, that is to say, at the front end. For that purpose it embodies a reinforced mounting frame 14 of generally U-shape (see Fig. 3), the arms 14ª of which embrace the front end of the tractor and are detachably bolted to the chassis, as indicated at 15.

On the side of the frame 14 opposite the power take-off is an upright supporting housing 16 of tubular form with a gear housing 17 at its lower end portion constituting, in effect, an enlargement of the same. An auger drive shaft 18 extends axially upward within this housing and protrudes from its lower end with an auger bit 19 fixed thereto suitable for boring in the earth. To support the housing structure 16, 17 on the frame 14 for tilting motion with reference to the tractor, the same is, in the present instance, pivoted by means of a sleeve 20 rigid with the gear housing 17 and projecting laterally from such housing transversely across the frame (see Figs. 3 and 6). This sleeve is journaled in bearings 21 fixed to the frame so that the housing structure 16, 17 carrying the auger may tilt fore and aft of the tractor about the horizontal axis of the sleeve 20.

The auger shaft 18 is journaled within the housing structure 16, 17 for both rotational and endwise movement. For that purpose the shaft 18, which is of square cross section, is slidably received within a sleeve 22 (Fig. 6) journaled within the gear housing 17 and restrained against axial movement with reference to the latter. The axial opening within the sleeve, through which the shaft 18 projects, is of complemental square cross section so that the shaft and sleeve turn together, although the shaft is slidable endwise with reference to the sleeve. The drive connection for rotating the auger shaft 18 from the power take-off pulley 10 includes the sleeve 22. Thus a bevel gear 23 is fixed to this sleeve and meshes with a pinion 24 on the adjacent end of a shaft 25 which extends axially through the housing sleeve 20. Fixed on the opposite end of this shaft 25 is a pulley 26 connected in driven relation with the power take-off pulley 10 by an endless belt 27. It will thus be seen that the auger supporting housing 16, 17 may be freely tilted about the axis of the sleeve 20 and shaft 25 without impairing the drive connection from the power take-off.

The feed of the auger into the ground is normally accomplished by the lead of its bit 19. Various soil conditions may, however, necessitate application of force either in a downward direction to augment the rate of feed, or in an upward direction to retard the feed. For example, in boring in very hard ground, it may be necessary to push down on the auger to get it to feed properly, whereas in soft wet ground it may be necessary to restrain the auger against feeding too fast in order to keep it from becoming clogged with earth. Moreover, provision must be made for applying force to the auger to lift it from the hole after boring is completed.

To accommodate manual application of force to the auger shaft in an endwise direction for the various purposes indicated, and with a minimum of muscular effort, a pair of chain-connected and suitably ratioed sprockets 28, 29 is used (Figs. 1 and 5). A ratio of high mechanical advantage is afforded by making the number of teeth on the sprocket 28 but a minor fraction of that on the sprocket 29, in the present instance the ratio being one to three. An endless chain 30 connects these sprockets. The lower sprocket 28 is fixed on a stub shaft 31 journaled in a bushing 32 rigid with a split sleeve clamp 33. The latter embraces the housing 16 and may be adjusted longitudinally of the latter to tension the chain 30.

The upper sprocket 29 is fixed to a stub shaft 29ᵃ (Fig. 5) journaled in a bearing provided on a cap 34 forming a closure for the top of the housing 16. Also fixed on the shaft 33 is a pinion 35 meshing with a rack 36 for converting rotary motion of the sprocket 29 into translatory motion. The rack 36 passes through a rectangular aperture 37 in the cap 34 and is thus restrained against rotation, the lower end of the rack 36 being connected by a thrust bearing 38 with the upper end of the auger shaft 18. The external diameter of the latter is such as to telescope within the housing 16 and guide the upper end of the auger shaft. The shaft 18 and rack 36 thus move endwise in unison, the shaft being permitted to rotate while the rack is restrained against rotation.

To make possible one-man operation of the tractor and attachment from the driver's seat 11 at the rear of the tractor, provision has been made for not only revolving the sprocket 28 from that point, but also for adjustably tilting the auger in a fore-and-aft direction. A single operating shaft, designated generally as 39, is used for performing such dual functions. Torque applied manually by the driver is transmitted through such shaft to the sprocket 28, and the shaft itself is adjustably shortened or lengthened to tilt the auger. In the present instance the shaft 39 includes a rod 40, connected at one end by universal joint 41 with the sprocket 28, and of square cross section in order that its opposite end may be telescopically received within a square sleeve 42 (see Fig. 4). Rigid with the opposite end of the sleeve 42 is a round rod or shaft 43 rotatably journaled in a sleeve 44 and restrained against endwise movement relative to the latter by suitable inwardly facing shoulders or collars 44ᵃ on the shaft 43 abutting the ends of the sleeve 44 (see Fig. 1ᵃ). The bearing sleeve 44 is fixed to an upright 44ᵃ which may be detachably secured to the tractor in any convenient manner, as, for example, by clamping the same to a supporting strut for the steering column. Coupling of the telescoping operating shaft members 40 and 42 to accommodate relative axial adjustment of the same for lengthening or shortening the operating shaft is accomplished through the use of a bar 45 (see Fig. 4) slotted longitudinally, as indicated at 46. The forward end of this bar is fixed to a stud 47 rigid with the upper one of a pair of transverse straps 48 tightly clamped to the bar 40 by bolts 49. The opposite end of the bar 45 has on it a laterally projecting hand grip 50 which may be conveniently grasped by the operator to either pull the same toward him or shove it away from him and respectively shorten or lengthen the operating shaft 39. The slotted bar 45 is clamped in its selected adjusted position by a clamping nut 51 having a hand grip 51ᵃ and threaded on a stud 52 passing through the slot 46, such stud being rigid with the upper one of a pair of straps 53 tightly clamped to the sleeve 42 by bolts 54. For rotation of the operating shaft 39 a pair of operating handles 55 (Fig. 1) are provided at opposite ends of a transverse bar 56 rigid with the end of the shaft 42, the bar 56 being fairly long so as to give a leverage of high mechanical advantage for applying torque to the shaft 39 with minimum muscular effort.

The operation of the tractor attachment will, in general, be clear from the foregoing. By way of recapitulation, it may be assumed that the tractor T has been stopped with the auger bit 19 located vertically above the point at which it is desired to bore a hole. Thereupon the driver engages the drive to the power take-off pulley 10 from the tractor engine, as, for example, through use of the conventional control lever 57, thus initiating rotation of the auger. The latter is lowered by turning the operating shaft 39 until it begins to bite into the ground. As the boring operation proceeds the driver observes the same and either retards or augments the axial feed of the auger bit 19 as may be required by the particular soil conditions encountered. For that purpose he grasps the handles 55 and turns the operating shaft 39 to apply torque in a direction either to thrust the auger downward or restrain its downward movement, as may be required. At the completion of the boring operation the power take-off drive is stopped, thus stopping rotation of the auger, and the operating shaft 39 turned manualy to raise the auger bit and thus withdraw it from the hole. Because of the mechanical advantage afforded by the leverage of the operating handle mechanism 55, 56 and the ratio of the sprockets 28, 29, comparatively little muscular effort need be exerted in either controlling the rate of auger feed or withdrawing the same.

After completing the boring of a hole as described, the driver reaches forward, loosens the clamping nut 51, and moves the slotted bar 45 endwise to tilt the housing 16 and auger carried thereby so that the latter is cleared from the ground. Then the tractor is driven forward to the next point at which a hole is to be bored. Thereupon the operator again adjusts the length of the operating shaft 39 to accommodate the angle of tilt of the auger required for the particular location encountered and repeats the boring operation as described above. In view of the freedom of angular adjustment of the auger relative to the tractor, holes can readily be bored in a substantially true vertical direction even though the tractor be standing in some inclined position, as, for example, on a slope, as indicated in Fig. 2.

From the foregoing it will be seen that a simple and rugged posthole digger for tractors has been provided. Moreover the same may be readily manipulated by a tractor driver for full control of the boring operation and the angle of the hole bored without the necessity of his leaving his normal operating station on the tractor. A series of holes may thus be bored with great rapidity.

I claim as my invention:

1. In a posthole digging attachment for tractors, the combination of an earth auger depending from the lower end of an upright shaft and adapted to be driven from a power take-off on the tractor, a support journaling said auger shaft for both rotational and endwise movement, means for detachably mounting said support on the tractor for tilting motion about a point displaced from the driver's station, a second support adapted to be mounted adjacent the driver's station, an elongated operating shaft extending between said supports and including a pair of members slidably adjustable axially of each other to alter the length of such shaft, one of said shaft members being journaled on said second support and restrained against endwise movement with respect to it, a manual operating handle on said operating shaft adjacent the driver's station adapted for use in rotating said shaft to transmit torque through the latter, and means including a rotary member journaled on the first-mentioned support and attached to the adjacent end of said operating shaft for utilizing torque applied to said operating shaft to impart an endwise thrust to said auger shaft, adjustment in the length of said operating shaft serving to adjust the angle of tilt of said first-mentioned support and the auger carried thereby about said pivot point.

2. In a posthole digging attachment for tractors, the combination of an earth auger depending from the lower end of an upright shaft and adapted to be driven from a power take-off on the tractor, a support journaling said auger shaft for both rotational and endwise movement, means for detachably mounting said support on the tractor for tilting motion about a pivot point displaced from the driver's station, a second support adapted to be mounted adjacent the driver's station, an extensible operating shaft extending between said supports and including a pair of telescoping members, a longitudinally slotted bar rigid with one of said members and a stud on the other member projecting through the slot in said bar, a laterally projecting hand grip on said bar for moving the same endwise to adjust the length of said extensible operating shaft, means for releasably clamping said stud at any selected point along the length of said slot, means for journaling one of said shaft members on said second support, and means including a rotary member journaled on the first-mentioned support and attached to the other of said shaft members for utilizing torque applied to said operating shaft to impart an endwise thrust to said auger shaft.

3. In a posthole digging attachment for tractors, the combination of an earth auger depending from the lower end of an upright shaft and adapted to be driven from a power take-off on the tractor, an upright generally tubular supporting housing in which said auger shaft is journaled for both rotational and endwise movement, means for detachably mounting said housing on the front end of the tractor chassis for tilting motion in a direction generally fore and aft of the tractor, a rack connected to the upper end of said auger shaft to move endwise therewith and restrained against rotation within said housing, a pinion meshing with said rack and having a toothed sprocket rotatable therewith, a second toothed sprocket, the number of teeth on the latter being but a minor fraction of the number of teeth on the first-mentioned sprocket, said sprockets being connected by an endless chain, a support adapted to be mounted adjacent the driver's station at the rear end of the tractor, an elongated operating shaft adapted to extend from front to rear of the tractor and including a pair of members slidably adjustable axially of each other to alter the length of such shaft, one of said shaft members being journaled on said support and having a manual operating handle thereon for rotating the shaft, and means including a universal joint for connecting said second sprocket to the forward end of said operating shaft for rotation by the latter and adjustment in the length of said operating shaft serving to tilt said housing about said pivot point.

ROGER JUNE PIPER.